(12) United States Patent
Shipman

(10) Patent No.: US 7,565,730 B2
(45) Date of Patent: Jul. 28, 2009

(54) METHOD OF CONNECTING A TUBING COMPONENT TO A PIPE OF AN AIR-CONDITIONING SYSTEM

(75) Inventor: Jon Shipman, Dursley (GB)

(73) Assignee: Reflok International Limited, Gloucestershire (GB)

( * ) Notice: Subject to any disclaimer, the term of this patent is extended or adjusted under 35 U.S.C. 154(b) by 0 days.

(21) Appl. No.: 10/534,089

(22) PCT Filed: Oct. 21, 2004

(86) PCT No.: PCT/GB2004/004436

§ 371 (c)(1),
(2), (4) Date: May 6, 2005

(87) PCT Pub. No.: WO2005/045297

PCT Pub. Date: May 19, 2005

(65) Prior Publication Data

US 2006/0284412 A1  Dec. 21, 2006

(30) Foreign Application Priority Data

Oct. 23, 2003  (GB) .................................. 0324700.4

(51) Int. Cl.
*B23P 11/00* (2006.01)
*B23P 17/00* (2006.01)
*F16L 55/00* (2006.01)

(52) U.S. Cl. ..................... 29/525.01; 285/12
(58) Field of Classification Search .................. 285/12, 285/148.22, 148.23; 138/DIG. 11; 29/506, 29/508, 516, 517, 525.01
See application file for complete search history.

(56) References Cited

U.S. PATENT DOCUMENTS

| | | | | | |
|---|---|---|---|---|---|
| 1,722,676 | A | * | 7/1929 | Parker | 285/148.23 |
| 1,765,709 | A | * | 6/1930 | Withington | 228/150 |
| 2,005,969 | A | * | 6/1935 | Cornell, Jr. | 285/148.23 |
| 2,449,754 | A | * | 9/1948 | Seitz | 285/4 |
| 2,682,800 | A | * | 8/1954 | Natelson | 73/864.02 |
| 3,471,179 | A | * | 10/1969 | Sixt | 285/148.22 |
| 3,544,672 | A | * | 12/1970 | Fitter et al. | 264/230 |
| 3,997,140 | A | * | 12/1976 | Mullins | 251/145 |
| 4,758,027 | A | * | 7/1988 | Todd | 285/148.23 |
| 5,143,408 | A | * | 9/1992 | Holtsmark | 285/93 |
| 5,375,887 | A | * | 12/1994 | Johnson | 285/12 |
| 5,635,058 | A | * | 6/1997 | Bowman | 210/172.1 |
| 5,791,695 | A | * | 8/1998 | Snider | 285/148.23 |
| 6,113,572 | A | * | 9/2000 | Gailey et al. | 604/93.01 |
| 6,409,220 | B1 | * | 6/2002 | Wing et al. | 285/12 |
| 6,467,506 | B1 | * | 10/2002 | Nguyen | 138/104 |
| 6,547,159 | B1 | * | 4/2003 | Westby | 239/204 |
| 6,883,552 | B2 | * | 4/2005 | Ooyauchi et al. | 138/177 |

FOREIGN PATENT DOCUMENTS

| | | |
|---|---|---|
| DE | 100 13 568 C1 | 3/1985 |
| GB | 606658 | 8/1948 |
| GB | 721656 | 1/1955 |
| GB | 2 288 860 A | 11/1995 |
| GB | 2 326 453 A | 12/1998 |

\* cited by examiner

*Primary Examiner*—James M Hewitt
(74) *Attorney, Agent, or Firm*—Vedder Price P.C.

(57) ABSTRACT

A kit of parts includes a tubing component having at least two in-line sections with different external diameters and a set of connection devices. Each connection device is dimensioned such that it may be joined to the tubing component at a respective section.

2 Claims, 3 Drawing Sheets

METHOD OF CONNECTING A TUBING COMPONENT TO A PIPE OF AN AIR-CONDITIONING SYSTEM

The present invention concerns the connection of tubing components to pipes, and has particular relevance to air-conditioning systems.

The global market for air-conditioning systems has risen dramatically in the last decade and looks set to continue to expand, for example into Eastern Europe. Currently, the most advanced air-conditioning system in common use is the VRV or Variable Refrigerant Volume system. This system comes in two types: "cooling only" which is a two-pipe system, or a three pipe system which performs cooling and heating providing heating through recognised heat-pump technology.

A network of pipes is installed around the building to supply refrigerant to the relevant cooling coils ("air handlers") in the required areas. FIG. 1 shows a known apparatus for assembly into such a network. A metal tubing component 1 is shown as a bifurcated Y-shaped junction to be connected to a metal pipe 2. The tube component 1 comprises several sections of different diameter, for example the first branch of the junction has two in-line sections $X_1$ and $X_2$, while the second branch has three in-line sections: $Y_1$, $Y_2$ and $Y_3$ to enable the component to be fitted to various standard, i.e. commercially accepted, sizes of pipe 2. When the component is to be fitted, the diameter of pipe 2 is determined and the correct diameter section of the component 1 is used to enable the pipe 2 to be accommodated within the section. In the figure shown, section $X_2$ has the correct diameter to allow pipe 2 to be inserted within it. If however pipe 2 was wider, then section $X_1$ would have to be used. In that case, the component would be cut off at section $X_1$ to allow insertion of the pipe 2. To fix the pipe 2 within the end section of component 1, the pipe and section are welded together. This is a cumbersome operation, especially since it is necessary to purge the weld region with nitrogen in order to prevent oxidation of the metal. Accordingly, the connection of tubing component 1 to pipe 2 is intricate and subsequently expensive and prone to error and fire risk, and takes an excessively long time to complete.

It is an object of the present invention to provide a connection kit and method which overcome the above problems. This is achieved by the use of cold jointing means with a correspondingly resized tubing component.

SUMMARY

In accordance with a first aspect of the present invention there is provided a kit of parts comprising a tubing component having at least two in-line sections with different external diameters and a set of connection means, each connection means having dimensions such that it may be joined to the tubing component at a respective section.

Preferably, each connection means comprises a locking ring.

The kit of parts may be used in fabricating an air-conditioning system.

In accordance with a second aspect of the present invention there is provided a method of connecting a tubing component to a pipe comprising the steps of:
  providing a tubing component with at least two in-line sections with different external diameters;
  selecting a section with a substantially similar diameter to that of the pipe;
  if the selected section is not at an end of the tubing component, cutting the tubing component in the vicinity of the selected section so that the selected section is at an end of the tubing component;
  providing a set of connection means in a range of sizes;
  selecting a connection means of suitable dimensions for joining to the selected section; and
  joining the selected connection means to the tubing component at the selected section.

Preferably, each connection means comprises a locking ring.

BRIEF DESCRIPTION OF THE DRAWINGS

The invention will now be described by way of example with reference to the following figures, in which.

DETAILED DESCRIPTION

Figure 1:
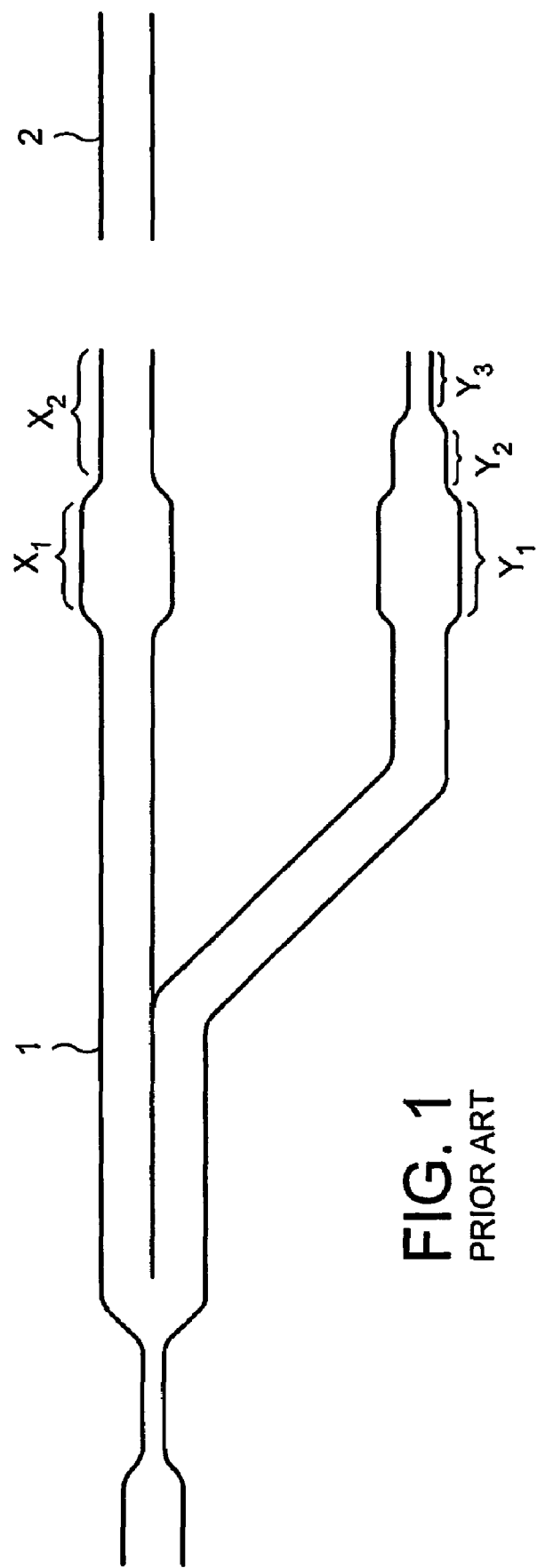
—
  FIG. 1 shows a conventional pipe assembly.
Figure 2:
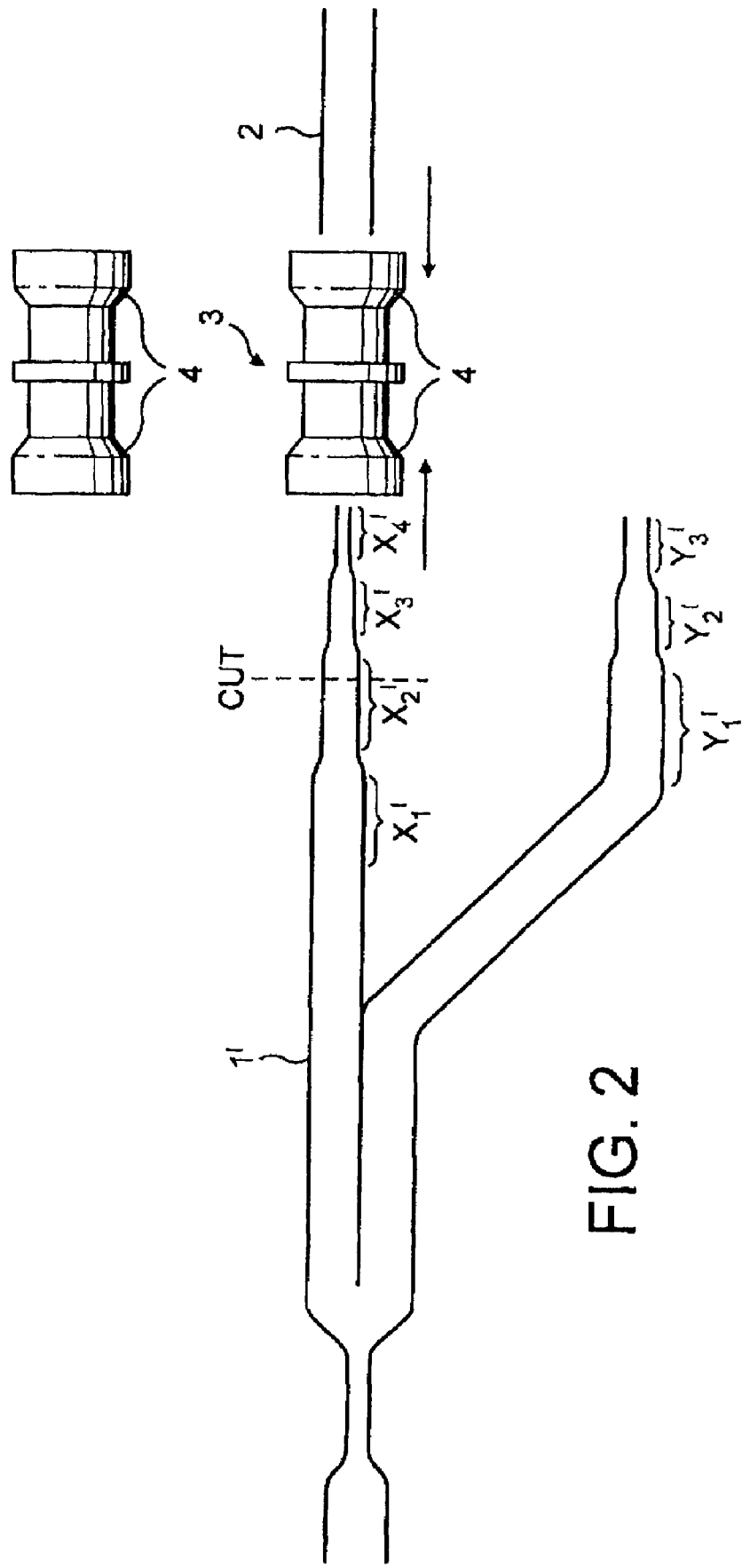
FIG. 2 shows an unconnected apparatus according to an embodiment of the present invention.
Figure 3:
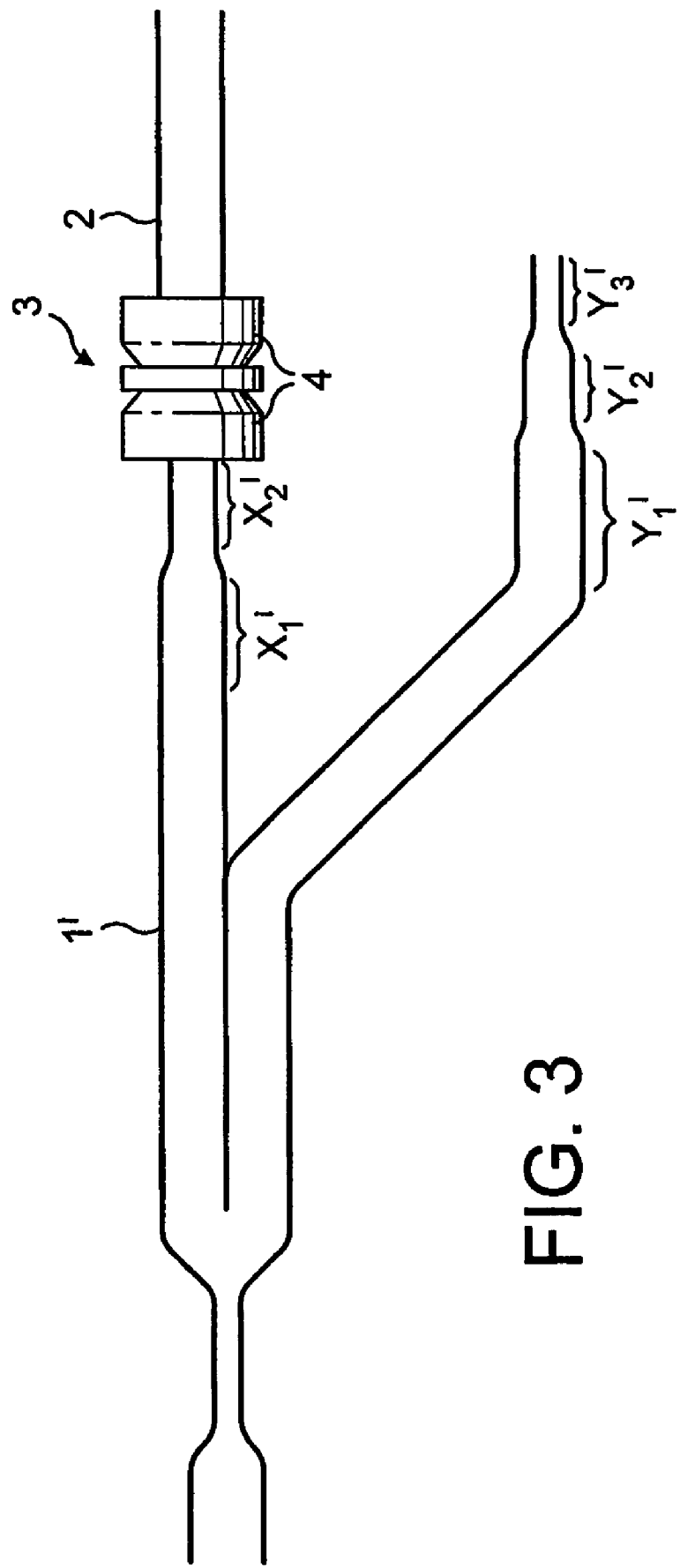
FIG. 3 shows the apparatus of the embodiment of FIG. 2 in a connected state.

Referring now to FIGS. 2 and 3, an assembly is shown according to an embodiment of the invention. Starting with FIG. 2, again it is desired to connect a tubing component 1' to a pipe 2. The tubing component 1' again comprises several sections of various external diameters, for example the in-line sections $X_1'$, $X_2'$, $X_3'$ and $X_4'$ of a first branch and in-line sections $Y_1'$, $Y_2'$ and $Y_3'$ of a second branch. However, with this embodiment the diameters of the sections are set to be standard, i.e. commercially accepted and available, sizes. Since the pipe 2 is also of a standard diameter, it is possible to select a section which has the same diameter as the pipe 2. In the example shown in the figure, section $X_2'$ has the same diameter as the pipe, and therefore the component is cut at section $X_2'$ as shown. Clearly it is also possible to select a section of the second branch to enable this branch to be connected also.

Connection between the component 1' and pipe 2 is achieved by use of a connection means 3, which in the present embodiment comprises a locking ring. A suitable locking ring for this purpose is for example manufactured by Vulkan Lokring, Rohrverbindungen GmbH & Co. KG of Herne, Germany. Connection is achieved by inserting the ends of the pipe and component into the locking ring as shown, the ends being covered with a sealing preparation beforehand if necessary. A compression device is then used to squeeze the two end rings 4 of the locking ring together, which compresses the ends and holds them tightly and sealingly within the connection means. The compression device will preferably comprise a manually operable tool, which uses a ratchet arrangement to assist the user in forcing the rings together. A powered compression device is also available, and both of these devices are manufactured by Vulkan Lokring for example. The connected assembly is shown in FIG. 3.

The advantage of using such a connection means is that the join can be done cold, i.e. without welding, thus reducing the complexity, time and cost of the assembly operation. Furthermore, no expensive or complex equipment is needed to fit the connection means.

A plurality of connection means of different sizes will be provided, allowing the tubing component to be fitted to a variety of sizes of pipe by appropriate selection of component width section and connection means.

Although the invention has been described with reference to the embodiments above, there are many other modifications and alternatives possible within the scope of the claims.

For example, any suitable cold connection means may be used in place of the locking ring.

The invention claimed is:

1. A method of connecting a tubing component to a pipe of an air-conditioning system, comprising:

providing a tubing component with at least two in-line sections with different external diameters;

selecting a section of the tubing component with substantially the same diameter as the pipe;

when the selected section is not at an end of the tubing component, cutting the tubing component in the vicinity of the selected section so that the selected section is at an end of the tubing component;

providing a set of connection means in a range of sizes;

selecting a connection means of suitable dimensions for joining to the selected section; and joining the selected connection means both to the tubing component at the selected section and to the pipe.

2. A method according to claim 1, wherein each connection means comprises a locking ring.

\* \* \* \* \*